March 30, 1965

D. E. BERGER 3,175,968

AUTOMATIC CONTROL AND OPTIMIZATION OF
A FLUIDIZED CATALYTIC CRACKER

Filed June 23, 1961

INVENTOR.
D. E. BERGER

BY Hudson & Young
ATTORNEYS

March 30, 1965     D. E. BERGER     3,175,968
AUTOMATIC CONTROL AND OPTIMIZATION OF
A FLUIDIZED CATALYTIC CRACKER
Filed June 23, 1961     2 Sheets-Sheet 2

INVENTOR.
D. E. BERGER

BY
*Hudson & Young*
ATTORNEYS

United States Patent Office 3,175,968
Patented Mar. 30, 1965

3,175,968
AUTOMATIC CONTROL AND OPTIMIZATION OF A FLUIDIZED CATALYTIC CRACKER
Donald E. Berger, Bartlesville, Okla., assignor to Phillips Petroleum Company, a corporation of Delaware
Filed June 23, 1961, Ser. No. 119,114
13 Claims. (Cl. 208—164)

This invention relates to a method of and apparatus for automatically controlling and optimizing the operation of fluidized catalytic cracking of petroleum oils.

The feasibility of applying computer systems to the control of continuous chemical processes is finding growing acceptance. Generally, various process measuring instruments feed data directly and automatically to the computer, and the computer carries out previously specified calculations. Based on these calculations, adjustments in the settings of process control instruments are made for optimum performance of the unit process.

As applied to petroleum refining processes, and to the operation of fluid catalytic crackers in particular, much remains to be done to realize the potential improved performance from computer control of process variables. The major primary or independent variables in catalytic cracking are: temperatures of the reactor and charge oils, reactor residence time, recycle ratio, catalyst flow rates, reactor fluidized catalyst bed level, flow rates of the charge oils, regeneration air flow rate and regenerator temperature.

I have discovered that one major economic benefit of computer control of a fluid catalytic cracker appears to lie in maintaining optimal product distribution by the manipulation of reaction conditions, while maintaining the process at its maximum loaded condition by the matching of reactor performance with regenerator performance. I achieve this primarily by equalizing coke laydown on the catalyst in the reactor with coke removal from the catalyst in the regenerator. In most catalytic cracking units, regenerator input air flow rate is set at its maximum, since this independent variable is usually the limiting factor of the entire plant. Within this limit, cracking operations are adjusted to that set of conditions which produces the greatest profitability, without causing the rate of coke deposition on the catalyst to be in excess of the coke burning capacity of the regeneration air. This is the key operation in the maximization-optimization program, with the computer also directing the adjustment of other primary variables in order to assure operation of the fluid catalytic cracker at maximum profit and maximum throughput simultaneously.

It is known that digital computers have certain advantages when complex and/or lengthy mathematical operations are to be carried out on discrete sets of data, because a sequence of many differing computing operations can be readily programmed into the former. It is also well known via technical and trade literature that the computing, maximizing and optimizing steps, herein performed by analog means with the process itself serving as the mathematical model upon which optimum seeking experimentation is performed, may also be performed by digital computing means which may employ linear programming, differential calculus and other mathematical methods of maximizing and optimizing either with or without a theoretical and/or empirical mathematical model.

However, in turn, analog computers have several important advantages for process control use. Among them are the relative simplicity of the equipment, which produces lower first costs and lower maintenance costs, the compatibility with analog measuring, transmitting and control devices, the ready adaptability to use with continuous, semi-continuous or sampled data inputs.

In many instances, the quality of the automatic control obtainable from a completely analog system may be superior to that from an analog-digital-analog system since the former is continuous and parallel in operation, while the latter is discrete and serial and may be additionally burdened with data logging and other duties.

According to my invention, I automatically control a fluid catalytic cracking process by the use of an analog computer control system. A number of process variables, such as material flow rates and a plurality of temperatures, and others, are measured, converted to suitable analog form and used by the computer in the calculation of process-derived variables and operating guides, such as: reactor coke laydown rate; regenerator coke burning capacity; percent conversion of charge oil; gross or net profit rate calculation; and other factors not susceptible of being directly measured. Critical process events are chosen from those calculated by the computer, and through conventional and optimum-seeking automatic control methods, various control signals are computed and applied to the system to produce both feedback and experimentally optimized control. For example, the aforementioned profit rate signal is fed to an optimizing controller, which varies both reactor temperature (via regenerated catalyst flow rate to the reactor), and reactor catalyst bed level (via spent catalyst flow rate back to the regenerator). These adjustments result in a change in the percentage conversion of charge oil, hence the distribution of products, and also to some degree influence the rate of coke laydown on the catalyst.

The objects of my invention are: to provide a method of and apparatus for automatic process control of a fluid catalytic cracking unit by using an analog computer; to provide an apparatus for automatically controlling a process by using analog computing and optimizing equipment to calculate and apply various control adjustments that are mathematically correlatable with data taken from the fluid catalytic cracking process involved; to provide a method of and apparatus for the automatic optimization of fluid catalytic cracking process by control adjustments based upon derived process factors calculated with a fixed program analog computer utilizing empirical, thermodynamic, stoichiometric and mass conservation relationships in the cracking unit and subsequent fractionation unit, to thereby produce said control adjustments; and to provide a method of and apparatus for the monitoring of a fluid catalytic cracking process using an analog computer.

Other objects, advantages and features of my invention will be apaprent to those skilled in the art without departing from the scope and spirit of this invention and it should be understood that the latter is not necessarily limited to the aforementioned discussion and accompanying drawing; wherein.

Figure 1:
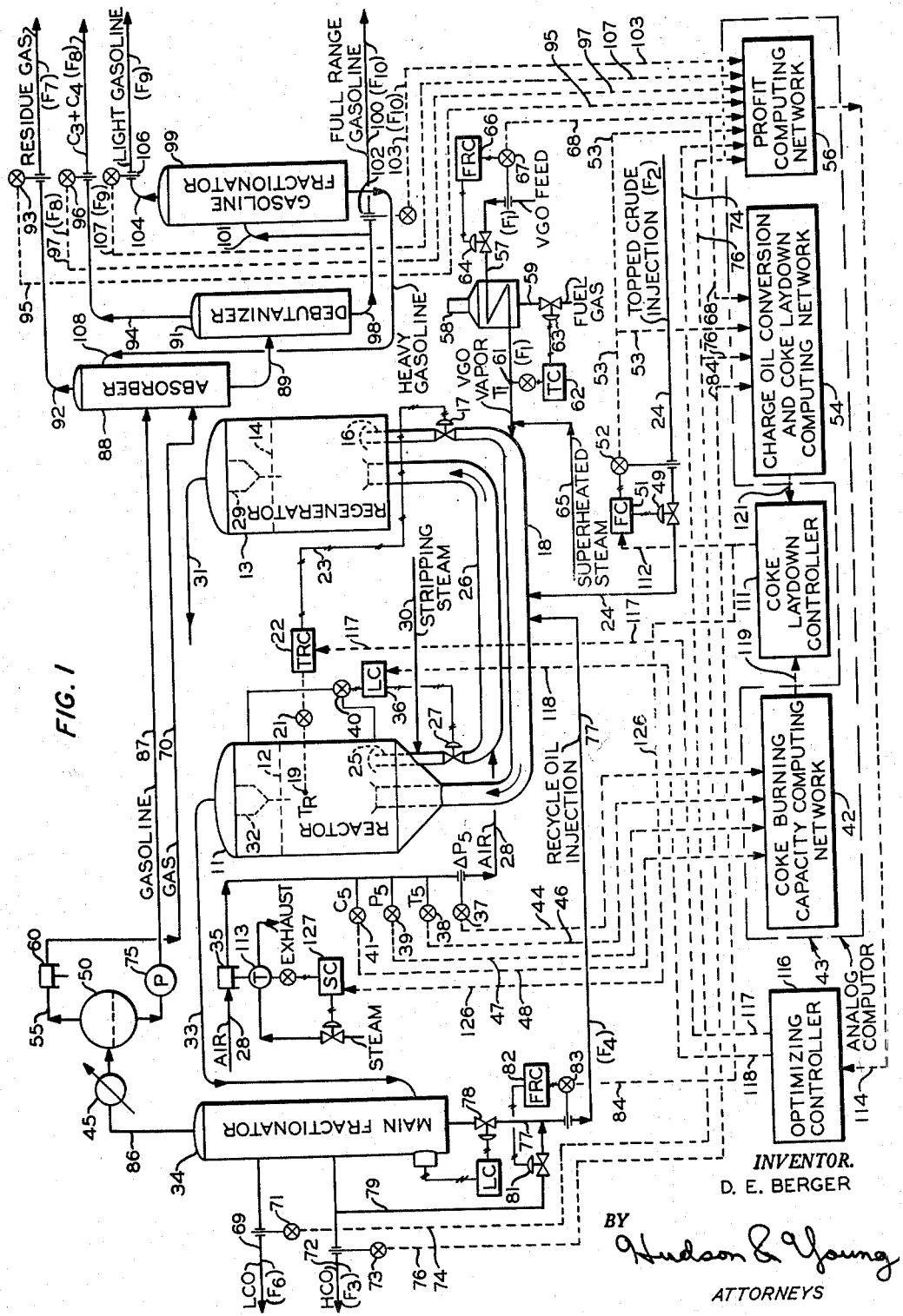
FIGURE 1 is a block diagram of a fluidized catalytic cracking reactor, regenerator and fractionation unit, in combination with an analog computer for controlling and optimizing a number of process variables.

Reference is now made to the drawing, and to FIGURE 1, in particular, wherein there is shown a fluid catalytic cracking reactor 11, having a mobile or fluidized bed of solid particles 12 disposed therein. A catalyst regenerator 13 has fluidized bed 14 therein the level of which is maintained approximately constant by periodic addition of fresh catalyst, the regenerated material overflowing into internal outlet line 16, from whence it passes through slide valve 17, and is fluidized in conduit 18 before entering reactor 11. The temperature of the hydrocarbon materials in the reactor, specifically the reactor bed or the dense phase mixture of hydrocarbon vapor, steam, and catalyst particles, can vary, this temperature $T_R$ being sensed by thermocouple 19 disposed therein. Thermocouple 19 connects through transducer 21 to temperature recorder-controller 22, which is operatively connected by means, indicated by control line 23, with valve 17, so that, in accordance with set point, on said controller, a greater or lesser quantity of hot regenerated catalyst is admixed with the hydrocarbon materials and steam entering transfer conduit 18 via conduits 24, 57 and 77, with the reactor temperature being thus regulated.

Reactor bed 12 may be comprised of a mixture of catalytic particles and non-catalytic solids fluidized by hydrocarbon vapors and steam. A stream of spent catalyst material is withdrawn from bed 12 via internal conduit 25, and is stripped by steam added through conduit 30 for oil removal. Then, the stripped coke-laden catalyst passes through slide valve 27, which is manipulated by level controller 36 in accordance with its set point 118 and the level measurement produced by differential pressure transmitter 40, dropping into transfer conduit 26 where it is fluidized by the regeneration air, and conveyed back into the bottom of regenerator 13. Air is supplied at a controlled rate via conduit 28 having compressor 35 disposed therein, to conduit means 26. Regeneration of the catalyst by the input air in fluidized bed 14 takes place at a temperature preferably between 950–1200° F.

The spent gases, from combustion of the carbonaceous solids deposited on the catalyst, pass therefrom through a cyclone 29, and outlet conduit 31. The products from reactor 11, in vapor form, pass upwardly through cyclone 32, and outlet line 33, to suitable recovery apparatus, such as main fractionator 34 and the subsequent separation system.

Air feed line 28 has disposed therein an orifice assembly and transmitter 37, the resulting signal designated $\Delta P_5$, therefrom being readily correlatable with flow rate; a temperature sensing element and transducer 38 to determine $T_5$; a pressure tap and transmitter 39 to determine $P_5$; and a composition analyzer and transmitter 41 to determine $C_5$; the transduced signals from each measurement component are transmitted to the coke burning capacity computing network 42, within analog computer 43, via signal lines 44, 46, 47 and 48, respectively.

Oil feed conduit 24, for supplying a high coke-forming type of hydrocarbon material, such as a topped crude oil, to conduit 18, to be catalytically cracked in reactor 11, has disposed therein a motor valve 49, actuated by flow controller 51, from flow measurement by turbine flowmeter-transmitter assembly 52. Assembly 52 provides a transduced signal via line 53, which is representative of the high coke-forming hydrocarbon feed rate, $F_2$, simultaneously to charge oil conversion and coke laydown computing network 54, as well as to profit computing network 56.

Feed conduit 57 supplies a distillate type of hydrocarbon material, such as a virgin gas-oil, at a rate $F_1$, to transfer conduit 18, also to be catalytically cracked in reactor 11. Feed conduit 57 is provided with a tube type preheat furnace 58 which is heated by combustion of fuel gas entering through conduit 59. Thermocouple 61, located in conduit 57, provides a signal $T_1$ to temperature controller 62, which in turn regulates the flow of fuel gas to furnace 58 through motor valve 63 disposed in conduit 59. Also disposed in conduit 57 is a motor valve 64, directed by flow recorder-controller 66, which receives a flow measurement signal from turbine flowmeter-transmitter assembly 67, all upstream of the furnace 58. The signal from transducer 67 also passes via signal line 68, simultaneously to computing networks 54 and 56. Superheated steam is added to conduit 57 via conduit 65 to assist vaporization of the oil and fluidization of the catalyst in conduit 18.

Referring again to main fractionator 34, two product streams are removed as steam stripped sidedraws. The streams are: light cycle oil stream 69, designated $F_6$, having turbine flowmeter assembly 71 disposed therein, and heavy cycle oil stream 72, designated $F_3$, having turbine flowmeter assembly 73 disposed therein. Signals representative of the flow rates of these two streams pass from transducers 71 and 73, via signal lines 74 and 76, respectively, simultaneously to computing networks 54 and 56. Main fractionator bottoms stream 77, designated $F_4$, having motor valve 78 disposed therein, directs non-converted oil and recovered catalyst back to reactor feed conduit 18 in accordance with liquid level in bottom of main fractionator 34 as sensed by level controller. Conduit 79 communicates between heavy cycle oil conduit 72 and bottoms slurry conduit 77. Motor valve 81 controls the flow through conduit 79, as directed by flow recorder-controller 82, which is connected with turbine flowmeter assembly 83 disposed in conduit 77. The signal representative of flow rate through flowmeter assembly 83 is transmitted via signal line 84 to computing network 54.

Gas and gasoline products pass overhead from main fractionator 34, via conduit 86 through condenser 45 to accumulator 50. Gas from accumulator 50 is passed through conduit 55, compressed in compressor 60 and passed via conduit 70 to absorber 88. Pump 75 disposed in conduit 87 passes the liquefied unstabilized gasoline from accumulator 50 also to absorber 88. Gasoline, enriched with $C_3$ and $C_4$ hydrocarbons, passes from the bottom of absorber 88 via conduit 89 to a debutanizer 91, while residue gas vents overhead via conduit 92 having turbine flowmeter assembly 93 disposed therein. Transducer 93 provides a signal 95, representative of the flow rate $F_7$ in conduit 92, to profit computing network 56.

$C_3$ and $C_4$ hydrocarbons pass overhead from column 91, via conduit 94, having turbine flowmeter assembly 96 disposed therein. Transducer 96 provides a signal 97, representative of the flow rate $F_8$, in conduit 94, to network 56. A full range gasoline product stream flows from debutanizer 91, via conduit 98, a portion of which is fed to gasoline fractionator 99, via conduit 101. Conduit 100 has turbine flowmeter assembly 102 disposed therein which provides a signal via line 103 to network 56, said signal representative of the flow rate $F_{10}$, of full range gasoline to storage. Light gasoline passes overhead from gasoline fractionator 99 via conduit 104 having turbine flowmeter assembly 106 disposed therein. Transducer 106 provides a signal, representative of the flow rate $F_9$, therein, via line 107, to profit computing network 56. Heavy gasoline from the bottom of fractionator 99 via line 108 provides absorption medium to the top of absorber 88.

The speed, at which steam turbine 113 drives compressor 35 disposed in air feed conduit 28, controls the rate of flow of air to regenerator 13 via conduit 26. This speed control means is conventional and is manually set to a desired value.

Network 42 takes the four measurement signals previously described from lines 44, 46, 47 and 48 and computes therefrom the coke burning capacity of regenerator 13, corresponding to the air flow rate thereto. Network 42 provides a single output signal, representative of this capacity, via line 119 as the manipulated set point input to coke laydown controller 111.

Network 54 takes three aforementioned measurement signals from lines 53, 68 and 76, and computes the fractional conversion (C) of the hydrocarbon material which enters the catalytic cracking system from feed lines 24 and 57. This value may be recorded if desired. Network 54 also takes signal 84 in addition to the aforementioned signals 53, 68, 76, and computes, along with the just computed weight fraction converted, a predicted rate of coke laydown for reactor 11. Network 54 provides a single output signal via line 121 as the measurement input to coke laydown controller 111. Controller 111 provides a single output signal via line 112 to adjust the set point of controller 51 to control the flow rate of high coke forming hydrocarbon material through conduit 24, so that the predicted coke laydown rate in reactor 11 approximately equals the coke burning capacity of regenerator 13.

Network 56 takes eight measurement signals from the aforementioned signal lines 53, 68, 74, 76, 95, 97, 103, and 107, and computes the gross profit rate of the hydrocarbon cracking operation. Network 56 transmits a single output signal via line 114 to optimizing controller 116. Controller 116 provides two control signals, one via line 117 to reactor temperature recorder-controller 22 to adjust the set point thereof, and the other via line 118 to reactor bed level controller 36 to adjust its set point, and in this way experimentally varies the temperature and catalyst bed level in reactor 11 until a yield and a distribution of reaction products is achieved which represents maximum profit rate.

In operation, all of the previously described temperature, pressure, flow, pressure differential, and stream composition measurements are made and transmitted in analog form, as required, to their related computing networks. These signals are representative of the magnitudes of said variables, and other preselected data influencing and resulting from the operations of said reactor and said regenerator.

In optimizing the operation of the disclosed fluidized catalytic cracking system, the following procedure is followed: steam turbine-air compressor system 113–35 is adjusted so as to produce a desired air flow, usually the maximum, to regenerator 13 via conduits 28 and 26. Next, network 42 computes the coke burning capacity of regenerator 13, corresponding to this air flow rate, responsive to the fixed stoichiometric equation of said network. A first analog signal, representative of this coke burning capacity, is transmitted via line 119 to coke laydown controller 111, for comparison purposes therein. Simultaneously, network 54 computes the conversion of the hydrocarbon material feeds within reactor 11 by a material balance equation, and utilizes the resulting weight fraction converted, in turn, to calculate predictively, from an empirical equation, the rate of coke laydown in reactor 11. This single output signal is transmitted from computing network 54 to coke laydown controller 111 via line 121. Controller 111 compares the first and second analog signals and obtains, by conventional means, a first control signal 112, the magnitude of which is related to the difference between the first and second signals, which control signal is transmitted to flow rate controller 51 to adjust the set point thereof. The flow rate of the high coke-forming hydrocarbon material in conduit 24 is thus automatically adjusted until the predicted coke laydown rate in reactor 11 approximately equals the coke burning capacity of regenerator 13.

With the coke laydown rate and coke burn off capacity in balance, profit computing network 56 computes the profit (the accumulated values of the product streams minus the accumulated values of the feed streams) in analog form. The resulting profit signal is transferred via line 114 to optimizing controller 116 which alternately adjusts the reactor temperature and the reactor catalyst bed level until the resulting hydrocarbon conversion level, yield and distribution of products from the catalytic cracking system represents the maximum profit rate, that is, achieves the maximum magnitude of signal 114 to controller 116.

The conventional measurement and control equipment previously described are available from many automatic controller manufacturers utilizing pneumatic or electronic energy or combinations of the two as the analog of the measurement and control signals. Likewise, equipment capable of performing the calculations given above is available in either pneumatic or electronic form, as desired, from several manufacturers. In most instances, complex automatic control and optimizing systems will use both pneumatic and electronic instrumentation, computation and control components to the best advantage. Measurement inputs and computing networks must be compatible in their analogies, therefore in some cases transducers from pneumatic to electrical signals or vice versa are required to achieve operability and mathematical consistency.

Regarding optimizing controller 116, a choice of commercial units are available to perform this function. For example, there is Quarie Maximizer, Model 760 Zero-Slope Controller, manufactured by Quarie Controllers, Sharon, Massachusetts. Two of these units, with an interlock time cycling, can provide the two control signals through lines 117 and 118 to adjust the set points on temperature-recorder-controller 22, and level controller 36, respectively, for maximum profitability.

The Model 760 is described in a bulletin published by Quarie Controllers. An article which provides a detailed description of Quarie Optimal Controllers is found in Instrumentation and Automation, volume 29, Number 11, November 1956.

Also, the Westinghouse Electric Company "Opcon" Unit, a two-variable Planned Experiment Optimizing Controller, discussed in Control Engineering, November 1959, page 124, can provide the dual control signals discussed above. An additional article which further details how such optimizers function is "Adaptive Control Systems," Mathias and Van Nice, Electro-Technology, October 1960, pages 116–125.

The calculation of the coke burning capacity of the regenerator, to be used as the desired value of coke laydown (as set point) of coke laydown controller 111, is as follows:

Air feed: pounds per hour of oxygen=

$$C_{o_A} C_5 \sqrt{\frac{\Delta P_5 P_5}{T_5}}$$

Pounds per hour coke which can be burned=

$$\frac{C_{o_A} K_8 C_5 \sqrt{\frac{\Delta P_5 P_5}{T_5}}}{K_9}$$

Pounds per hour coke which can be burned=

$$K_{10} C_5 \sqrt{\frac{\Delta P_5 P_5}{T_5}}$$

$\Delta P_5$=pressure drop in air fed line
$T_5$=temperature of air feed
$P_5$=flowing pressure of air feed
$C_5$=weight fraction oxygen in air stream
$C_{o_A}$=air venturi (orifice) coefficient
$K_8$=oxygen utilization efficiency (98 percent of $O_2$ is combusted)
$K_9$=2.54 pounds $O_2$ (which is required to burn one pound of coke, which contains 7 weight percent hydrogen, to $H_2O$ and a ratio of $CO_2/CO$ of 1.5/1.)
$K_{10}$=accumulated constant, combining $$\frac{C_{o_A} \times K_8}{K_9}$$

$K_{10}$ should be manually adjustable so that changes in the efficiency of stripping residual oil from catalyst (which leaves "hydrogen in coke"), and changes in regeneration conditions which produce different $CO_2/CO$ ratios can be introduced from time to time, as needed. Measurements of $CO_2/CO$ (by stack analysis, or by its relation to regenerator temperature), and of percent hydrogen (by computations from stack analysis) may be used in computations to correct $K_{10}$ manually.

Charge oil conversion (material balance) calculation on reactor:

$$C = \frac{F_1 + F_2 - F_3}{F_1 + F_2} = \text{weight of fraction of charge oils converted}$$

$F_1$ = virgin gas oil feed, pounds per hour
$F_2$ = topped crude feed, pounds per hour
$F_3$ = heavy cycle oil yield, pounds per hour
$CLR = F_1(K_1 + K_2C) + F_2(K_3 + K_4C)$
$\qquad + F_4(K_5 + K_6) + (F_1 + F_2 + F_4)K_7$
= reactor coke laydown rate calculation (pounds of coke per hour)

wherein:

$F_4$ = recycle non-converted oil, pounds per hour
$K_1$ = weight percent carbon residue in virgin gas oil
$K_2$ = weight percent coke per percent converted for virgin gas oil
$K_3$ = weight percent carbon residue in topped crude oil
$K_4$ = weight percent coke per percent converted for topped crude oil
$K_5$ = weight percent carbon residue in recycle oil
$K_6$ = weight percent coke per percent converted for recycle oil
$K_7$ = pounds coke per pound feed due to catalyst condition K's 1, 3, 5 are to be manually adjustable and can be corrected from lab data on the oil stocks.

K's 2, 4, 6, 7 probably need infrequent correction.

Profitability calculations:

$$P = (F_1 \times K_{11}) + (K_6 \times K_{12}) + (F_7 \times K_{13}) + (F_8 \times K_{14})$$
$$\qquad + (F_9 \times K_{15}) + (F_{10} \times K_{16}) - [(F_1 \times K_{17}) + (F_2 \times K_{18})]$$

wherein:

$P$ = gross profit, dollars per hour
$F_3$ = heavy cycle oil yield, pounds per hour
$K_{11}$ = value of heavy cycle oil, dollars per pound
$F_6$ = light cycle oil, pounds per hour
$K_{12}$ = value of light cycle oil, dollars per pound
$F_7$ = residue gases, pounds per hour
$K_{13}$ = value of residue gas, dollars per pound
$F_8$ = $C_3$ and $C_4$ hydrocarbons, pounds per hour
$K_{14}$ = value of alkylation feed ($C_3 + C_4$), dollars per pound
$F_9$ = light gasoline, pounds per hour
$K_{15}$ + value of low end point gasoline, dollars per pound
$F_{10}$ = full range gasoline, pounds per hour
$K_{16}$ = value of high end point gasoline, dollars per pound
$F_1$ = virgin gas oil feed, pounds per hour
$K_{17}$ = value of virgin gas oil, dollars per pound
$F_2$ = topped crude feed, pounds per hour
$K_{18}$ = value of topped crude oil, dollars per pound Profitability is expressed as gross profit rate (the accumulated values of products minus the accumulated values of feeds per unit time). Within the permissible ranges of operation, the catalyst cost, utility, labor and fixed costs are reasonably constant, so that they may be ignored. In this calculation, coke is given zero value, therefore the energy from its combustion which generates steam and heats catalyst is justifiably free.

The utilization of these analog signals, representative of a variety of process variables, will now be described in more detail in connection with analog computer 43 of FIGURE 1, wherein the computer is separated into several component networks. These networks, in turn, are broken down into functional components. It should be understood, therefore, that the individual components of computer 43 are not to be considered the invention, but rather that the invention resides in the combination of these components into a specific cooperation which permits the automatic computation of derived process variables, and the maximizing and optimizing control of a fluidized catalytic cracker, and in the above described method of operation.

Figure 2:
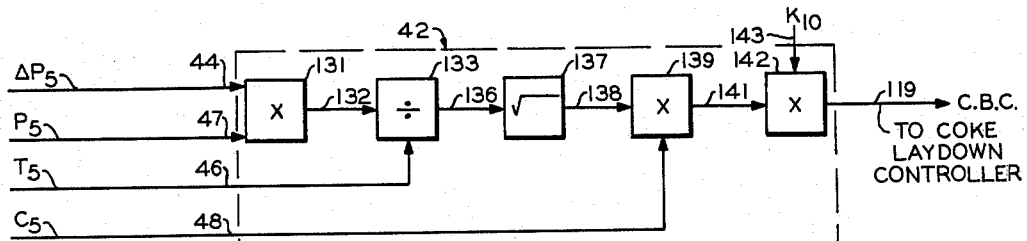
FIGURE 2 illustrates a schematic diagram of elements or components of a coke burning capacity computing network which can be employed in the control system illusrated in FIGURE 1.

Referring now to FIGURE 2, four measurement signals are transmitted to coke burning capacity computing network 42. The signals from lines 44 and 47 pass to multiplying component 131. The resulting product signal passes via lead 132 to dividing component 133, wherein said product signal is divided by a signal entering component 133 via lead 46. This divisor signal 46 is representative of the temperature $T_5$, of the air feed of line 28.

The quotient signal from component 133 passes via line 136 to a square root extracting component 137. The resulting signal passes via lead 138 to a second multiplying component 139, wherein it is multiplied by a signal entering component 139 via line 48. This multiplier signal is representative of weight fraction of oxygen in the air feed.

The resulting product signal passes via lead 141 to a third multiplying component 142, wherein said product is multiplied by a signal entering component 142 via lead 143. The third multiplier signal is the accumulated constant $K_{10}$, which is a direct function of the orifice coefficient and $K_8$ and an indirect function of the constant $K_9$. Signal $K_{10}$ is manually set as an input signal on terminal 143 of component 142. This product signal, representative of the coke burning capacity of regenerator 13 passes via lead 119 to coke laydown controller 111 of FIGURE 1.

Figure 3:
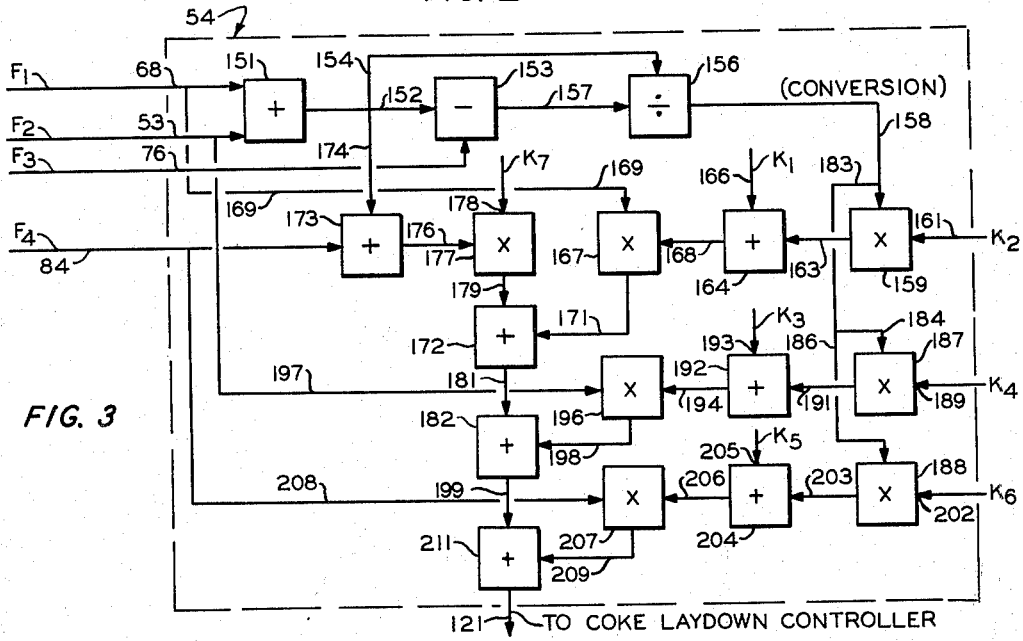
FIGURE 3 illustrates a similar schematic diagram of a charge oil conversion and coke laydown computing network which forms part of the control and optimizing system of this invention.

Referring now to FIGURE 3, wherein four signals, representative of the flow rates in as many streams, are transmitted to charge oil conversion and coke laydown computing network 54. The input signals from lines 53 and 68 pass to adding component 151. The resulting summed signal passes via line 152 to subtracting component 153, serving therein as the minued; and simultaneously passing via line 154 to dividing component 156, serving therein as the divisor.

The input signal from line 76 serves as the subtrahend in component 153. The remainder signal therefrom passes via line 157 to component 156, serving therein as the dividend. The resulting quotient signal, representative of the weight fraction of charge oil converted (C), passes via line 158 to multiplying component 159. Also, a signal, $K_2$, is manually set as an input on component 159 via terminal 161, $K_2$ being a constant equal to weight percent of coke per percent converted for virgin gas oil (VGO).

The resulting product signal passes via line 163 to adding component 164, wherein a signal, representative of the constant $K_1$ which equals the weight percent carbon residue in the VGO, is aded thereto via line 166. The resulting summed signal passes to multiplying component 167, via line 168. Another signal enters component 167 via line 169, this signal being equal to the input signal in line 68. The resulting product signal passes via line 171 to adding component 172.

The fourth input signal enters network 54, via line 84, passing to adding component 173, wherein it is summed with the summed signal from adding component 151, entering component 173 via lead 174. This resulting summed signal passes via line 176 to multiplying component 177, wherein it is multiplied by a signal representative of the constant $K_7$, which is manually set as an input signal on terminal 178 of component 177. $K_7$ is equal to the pounds of coke per pound of feed due to the catalyst condition. The resulting product signal passes via line 179 to adding component 172, wherein it is summed with the signal from line 171. This resulting summed signal passes via line 181 to another adding component 182.

Referring again to line 158, it will be seen that it branches into line 183, which in turn branches into lines 184 and 186, passing to multiplying components 187 and 188, respectively.

Regarding component 187, a signal, $K_4$, is manually set thereon as an input on terminal 189. $K_4$ is a constant equal to weight percent coke per percent converted for topped crude oil (TCO). The resulting product signal passes via line 191 to adding component 192, wherein a signal representative of the constant $K_3$, weight percent carbon residue in the topped crude oil, is manually set thereon via input terminal 193. The resulting summed signal passes via line 194 to multiplying component 196, wherein it is multiplied by another signal entering via line 197, the latter signal being equal to the input signal in line 53. The resulting product signal passes via line 198 to adding component 182, wherein it is summed with the summed signal from line 181. This resulting summed signal passes via line 199 to another adding component 211.

Regarding multiplying component 188, a signal, $K_6$, is manually set thereon via input terminal 202. $K_6$ is a constant equal to the weight percent coke per percent converted for recycle oil. This resulting product signal passes via line 203 to an adding component 204, wherein a signal representative of the constant $K_5$, weight percent carbon residue in recycle oil, is manually set thereon via input terminal 205. The resulting summed signal passes via line 206 to multiplying component 207, wherein it is multiplied by another signal entering via line 208, this latter signal being equal to the input signal in line 84. The resulting product signal passes via line 209 to final adding component 211, wherein it is summed with the summed signal from line 199. The resulting final summed signal passes from network 54, via line 121 to coke laydown controller 111 of FIGURE 1, representative of the coke laydown rate of reactor 11.

Figure 4:
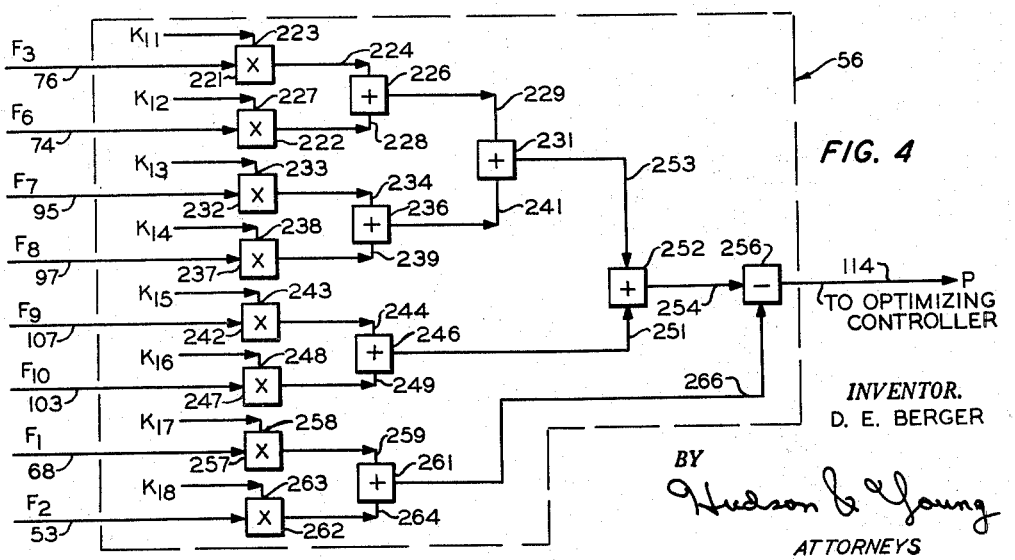
FIGURE 4 illustrates another schematic diagram of a profit computing network which also forms a part of this invention.

Referring now to FIGURE 4, wherein eight signals representing as many measured process variables, are transmitted to profit computing network 56. First and second input signals from lines 76 and 74 pass to multiplying components 221 and 222, respectively.

Regarding multiplying component 221, a signal, $K_{11}$, is manually set thereon via input terminal 223. $K_{11}$ is a constant equal to the value of the heavy cycle oil flowing through conduit 72 of FIGURE 1. A signal representative of this flow rate, designated $F_3$, is received via line 76. The resulting product signal passes via line 224 to a first adding component 226.

Regarding second multiplying component 222, a signal, $K_{12}$, is manually set thereon via input terminal 227. $K_{12}$ is a constant equal to the value of the light cycle oil, flowing through conduit 69 of FIGURE 1. A signal representative of this flow rate, designated $F_6$, is received via line 74. The resulting product signal passes via line 228 to adding component 226, wherein it is summed with the signal from line 224. The first summed signal passes via line 229 to a second adding component 231.

A third input signal from line 95 passes to a third multiplying component 232. A multiplier signal, $K_{13}$, is manually set thereon via input terminal 233. $K_{13}$ is a constant equal to the value of the residue gas flowing through conduit 92 in FIGURE 1. A signal representative of this flow rate, designated $F_7$, is received via line 95. This resulting product signal passes via line 234 to third adding component 236.

A fourth input signal from line 97 passes to fourth multiplying component 237. A multiplier signal, $K_{14}$, is manually set thereon via input terminal 238. $K_{14}$ is a constant equal to the value of the alkylation feed $(C_5+C_4)$ flowing through conduit 96 of FIGURE 1. A signal representative of this flow rate, designated $F_8$, is received via line 97. The resulting product signal passes via line 239 to third adding component 236, wherein it is summed with the signal from line 234. This second summed signal passes via line 241 to second adding component 231, wherein it is summed with the first summed signal.

A fifth input signal from line 107 passes to a fifth multiplying component 242. A multiplier signal, $K_{15}$, is manually set thereon via input terminal 243. $K_{15}$ is a constant equal to the value of the low end point (light) gasoline, flowing through conduit 104 of FIGURE 1. A signal representative of this flow rate, designated $F_9$, is received via line 107. The resulting product signal passes via line 244 to a fourth adding component 246.

A sixth input signal from line 103 passes to a sixth multiplying component 247. A multiplier signal, $K_{16}$, is manually set thereon via input terminal 248. $K_{16}$ is a constant equal to the value of high end point (heavy) gasoline flowing through conduit 100 of FIGURE 1. A signal representative of this flow rate, designated $F_{10}$, is received via line 103. The resulting product signal passes via line 249 to said fourth adding component 246, wherein it is summed with the signal from line 244. The resulting third summed signal passes via line 251 to fifth adding component 252, wherein it is summed with a fourth summed signal entering via line 253 from second adding component 231. The resulting fifth summed signal passes via line 254 to subtracting component 256, to serve therein as the minuend.

A seventh input signal from line 68 passes to a seventh multiplying component 257. A multiplier signal, $K_{17}$, is manually set thereon via input terminal 258. $K_{17}$ is a constant equal to the value of the virgin gas oil feed, flowing through conduit 57 of FIGURE 1. A signal representative of this flow rate, designated $F_1$, is received via line 68. The resulting product signal passes via line 259 to a sixth adding component 261.

An eighth input signal from line 53 passes to an eighth multiplying component 262. A multiplier signal, $K_{18}$, is manually set thereon via input terminal 263. $K_{18}$ is a constant equal to the value of the topped crude oil feed flowing through conduit 24 of FIGURE 1. A signal representative of this flow rate, designated $F_2$, is received via line 53. The resulting product signal passes via line 264 to sixth adding component 261, wherein it is summed with the signal from line 259.

The resulting sixth summed signal passes via line 266 to component 256 to serve therein as the subtrahend. The resulting remainder signal passes from network 56 via line 114 to optimizing controller 116, wherein the two control signals 117 and 118 of unit 116 are produced as previously described.

To one skilled in the analog computing art, it will be obvious that in many cases several mathematical operations in FIGURES 2, 3 and 4 may be combined in one piece of computing equipment, so that the apparent number of computing steps in an actual apparatus will be reduced.

Under certain circumstances in the operation of a unit for fluidized catalytic cracking of petroleum oils, the volume of topped crude oil and other oils being charged to the reactor has a coke laydown rate on the catalyst that is substantially less than the coke burning capacity of the companion regenerator, when the air flow rate is set at a maximum. This can come about even though the charge oil is being cracked to an economic level of conversion, if the topped crude charge rate is limited.

Thus, the volume, or flow rate, of the charge oil becomes the independent variable, with the air flow rate becoming the dependent variable. In this situation, the output signal from coke burning capacity computing network 42 via 119 becomes the measurement input to coke laydown controller 111, while the output signal from coke laydown computing network 54 is used as the manipulated set point input to controller 111. In this embodiment, controller 111 will provide its output signal via line 126 to speed controller 127 to regulate the speed of steam turbine 113, which in turn drives the air compressor 35 in the air line to regenerator 13. Meanwhile, the set point of flow controller 51 in the topped crude oil feed line 24 is adjusted to its desired value manually.

While the workings of the fluidized catalytic cracking system described above represent the preferred embodiments of this invention, other methods of producing the derived variables used as the bases of computer control are known. For example, mathematical combination of the coke content (determined by on-stream analysis employing a method such as optical reflectance), of spent and regenerated catalyst and of the circulation rate of the catalyst will produce the pounds of coke actually laid down in the reactor thus circumventing the calculation in an empirical-predictive fashion of the coke to-be-laid down. Similarly, the conversion of the oil feeds to products and coke can be determined by empirical-theoretical heat balance methods rather than by material balance.

Various modifications and alterations of this invention will become apparent to those skilled in the art without departing from the scope and spirit of this invention and it should be understood that the latter is not necessarily limited to the aforementioned discussion.

I claim:

1. Apparatus comprising: a fluid catalytic cracking reactor having a variable reactor temperature and catalyst bed level; a catalyst regenerator; a main fractionator; first conduit means communicating between said regenerator and said reactor for the purpose of conducting hot regenerated catalyst into the latter; second conduit means for feeding a highest coke-forming hydrocarbon material to be catalytically cracked communicating with said first conduit means; third conduit means also communicating between said reactor and said regenerator for the purpose of conducting spent catalyst to the latter; fourth conduit means for feeding air to regenerate the flowing spent catalyst communicating with said third conduit means; fifth conduit means communicating with the upper portion of said reactor for conducting reaction products and unreacted feed material to said main fractionator; sixth conduit means communicating with the upper portion of said regenerator for conducting flue gases to vent; seventh conduit means communicating with the bottom of said fractionator for conducting non-converted products back to said first conduit means; eighth conduit means for feeding a distillate type of hydrocarbon material to be catalytically cracked communicating with said first conduit means; means for measuring temperature $T_5$, pressure $P_5$, composition $C_5$, and an orifice differential pressure $\Delta P_5$ of the air flowing through said fourth conduit means; means for measuring the flow rate $F_2$ through said second conduit means, the rate of fluid flow $F_1$ through said seventh conduit means, and the rate of flow $F_4$ through said eighth conduit means; means for measuring the flow rates $F_3$, $F_6$, $F_7$, $F_8$, $F_9$ and $F_{10}$ of the separated products of the catalytic cracking process comprising heavy cycle oil, light cycle oil, residue gases, $C_3$ and $C_4$ hydrocarbons, light gasoline, and full range gasoline, respectively; means for controlling the rate of flow of said highest coke-forming hydrocarbon material feed through said second conduit means; means for controlling the rate of flow of air through said fourth conduit means; means for controlling the rate at which regenerated catalyst flows from said regenerator through said first conduit means; means for controlling the rate at which spent catalyst flows from said reactor through said third conduit means; a computer having a fixed program; first means within said analog computer for computing the coke burning capacity in said regenerator and providing a first signal representative thereof; means for establishing and for transmitting signals representative of said $T_5$, $P_5$, $C_5$ and $\Delta P_5$ to said first means within said analog computer; second means within said analog computer for computing the conversion of said hydrocarbon material feeds and for computing therefrom predictively the rate of coke laydown in said reactor and providing a second signal representative of the latter; means for establishing and for transmitting signals representative of said $F_1$, $F_2$, $F_3$, $F_4$ process measurements to said second means within said analog computer; means responsive to the difference between said signals for adjusting the flow control means on the second conduit means so that the coke laydown rate in said reactor approximately equals the coke burning capacity in said regenerator; third means within said computer for computing the profit of said hydrocarbon cracking operation and obtaining a profit signal; means for establishing and for transmitting signals representative of said $F_3$, $F_6$, $F_7$, $F_8$, $F_9$, $F_{10}$, $F_1$ and $F_2$ process measurements to said third means within said computer; an optimizing controller means responsive to said profit signal for adjusting the flow control means on both said first conduit and said third conduit to manipulate the flow rate of regenerated catalyst from said regenerator, and the flow rate of the spent catalyst from said reactor, respectively, in order to vary reactor temperature and catalyst bed level, respectively, until distribution and yield of reaction products achieves maximum profit.

2. Apparatus comprising: a fluid catalytic cracking reactor having a variable reactor temperature and catalyst bed level; a catalyst regenerator; a main fractionator; first conduit means communicating between said regenerator and said reactor for the purpose of conducting hot regenerated catalyst into the latter; second conduit means for feeding a high coke-forming hydrocarbon material to be catalytically cracked communicating with said first conduit means; third conduit means also communicating between said reactor and said regenerator for the purpose of conducting spent catalyst to the latter; fourth conduit means for feeding air to regenerate the flowing spent catalyst communicating with said third conduit means; fifth conduit means communicating with the upper portion of said reactor for conducting reaction products and unreacted feed material to said main fractionator; sixth conduit means communicating with the upper portion of said regenerator for conducting flue gases to vent; seventh conduit means communicating with the bottom of said fractionator for conducting non-converted products back to said first conduit means; eighth conduit means for feeding a distillate type of hydrocarbon material to be catalytically cracked communicating with said first conduit means; means for measuring temperature $T_5$, pressure $P_5$, composition $C_5$, and an orifice differential pressure $\Delta P_5$ of the air flowing through said fourth conduit means; means for measuring the flow rate $F_2$ through said second conduit means, the rate of fluid flow $F_1$ through said seventh conduit means, and the rate of flow $F_4$ through said eighth conduit means; means for measuring the flow rates $F_3$, $F_6$, $F_7$, $F_8$, $F_9$ and $F_{10}$ of the separated products of the catalytic cracking process comprising heavy cycle oil, light cycle oil, residue gases, $C_3$ and $C_4$ hydrocarbons, light gasoline, and full range gasoline, respectively; means for controlling the rate of flow of said highest coke-forming hydrocarbon material feed through said second conduit means; means for controlling the rate of flow of air through said fourth conduit means; a computer having a fixed program; first means within said computer for computing the coke burning capacity in said regenerator and providing a first signal representative thereof; means for establishing and for transmitting signals representative of said $T_5$, $P_5$, $C_5$ and $\Delta P_5$, to said first means within said analog computer; second means within said analog computer for computing the conversion of said hydrocarbon material feeds and for computing therefrom predictively the rate of coke laydown in said reactor and providing a second signal representative of the latter; means for establishing and for transmitting signals representative of said $F_1$, $F_2$, $F_3$ and $F_4$ process measurements to said second means within said analog computer; and means responsive to the difference between said signals for adjusting the flow control means on the high coke-forming hydrocarbon material feed conduit so that the coke laydown rate in said reactor approximately equals the coke burning capacity in said regenerator.

3. Apparatus comprising: a fluid catalytic cracking reactor having a variable reactor temperature and catalyst bed level; a catalyst regenerator; a main fractionator; first conduit means communicating between said regenerator and said reactor for the purpose of conducting hot regenerated catalyst into the latter; second conduit means for feeding a high coke-forming hydrocarbon material to be catalytically cracked communicating with said first conduit means; third conduit means also communicating between said reactor and said regenerator for the purpose of conducting spent catalyst to the latter; fourth conduit means for feeding air to regenerate the flowing spent catalyst communicating with said third conduit means; fifth conduit means communicating with the upper portion of said reactor for conducting reaction products and unreacted feed material to that main fractionator; sixth conduit means communicating with the upper portion of said regenerator for conducting flue gases to vent; seventh conduit means communicating with the bottom of said fractionator for conducting non-converted products back to said first conduit means; eighth conduit means for feeding a distillate type of hydrocarbon material to be catalytically cracked communicating with said first conduit means; means for measuring temperature $T_5$, pressure $P_5$, composition $C_5$, and an orifice differential pressure $\Delta P_5$ of the air flowing through said fourth conduit means; means for measuring the flow rate $F_2$ to said second conduit means, the rate of fluid flow $F_1$ from said seventh conduit means and the rate of flow $F_4$ from said eighth conduit means; means for measuring the flow rates $F_3$, $F_6$, $F_7$, $F_8$, $F_9$ and $F_{10}$ of the separated products of the catalytic cracking process comprising heavy cycle oil, light cycle oil, residue gases, $C_3$ and $C_4$ hydrocarbons, light gasoline and full range gasoline, respectively; means for controlling the rate of flow of said highest coke-forming hydrocarbon material feed through said second conduit means; means for controlling the rate of flow of air through said fourth conduit means; means for controlling the rate at which regenerated catalyst flows from said regenerator; means for controlling the rate at which spent catalyst flows from said reactor; a computer having a fixed program; first means within said computer for computing the profit of said hydrocarbon cracking operation and obtaining a profit signal; means for establishing and for transmitting signals representative of said $F_3$, $F_6$, $F_7$, $F_8$, $F_9$, $F_{10}$, $F_1$ and $F_2$ process measurements to said first means within said computer for computing the profit of said hydrocarbon cracking operations and obtaining a profit signal; and an optimizing controller means responsive to said profit signal for adjusting the flow control means on both said first conduit and said third conduit to manipulate the flow rate of regenerated catalyst from said regenerator, and the flow rate of the spent catalyst from said reactor, respectively, in order to vary reactor temperature and catalyst bed level, respectively, until distribution and yield of reaction products achieves maximum profit.

4. A method for automatically controlling and optimizing the fluidized catalyst cracking of petroleum oils responsive to control signals calculated by a computer having a fixed program, comprising: setting the air flow rate to the catalyst regenerator at its maximum value; computing the coke burning capacity of said regenerator corresponding to said maximum air flow rate according to a stoichiometric calculation within said fixed program to give a first computed measurement signal; computing the conversion of said hydrocarbon material feeds within a fluidized catalytic reactor according to a material balance calculation within said fixed program; computing therefrom predictively the rate of coke laydown in said reactor according to a coke laydown calculation within said fixed program to give a second signal; comparing said first and second signals and obtaining a first control signal, the magnitude of which is related to the difference between said first and second signals; adjusting the flow rate of the highest coke-forming charge oil feed to said reactor responsive to said first control signal until the coke laydown rate approximately equals the coke burning capacity; and adjusting the reactor temperature by means of varying the flow rate of regenerated catalyst from said regenerator, and also adjusting the reactor catalyst bed level by means of varying the flow rate of the spent catalyst from said reactor both by use of a control means which is responsive to an optimizing signal transmitted by said computer, until the resulting hydrocarbon conversion level and distribution and yield of products from said catalytic cracking process represents the optimum of the petroleum oils cracking operation.

5. The method according to claim 4 wherein said high coke-forming charge oil feed is a topped crude.

6. The method according to claim 4 wherein said stoichiometric calculation is computed according to the equation:

$$CBC = \frac{C_{oA} K_8 C_5 \sqrt{\frac{\Delta P_5 P_5}{T_5}}}{K_9}$$

wherein:

$CBC$ = Coke burning capacity of said regenerator expressed in pounds per hour of coke
$C_{oA}$ = Air venturi (orifice) coefficient
$\Delta P_5$ = Pressure drop in air feed line
$P_5$ = Flowing pressure of air feed
$T_5$ = Temperature of air feed
$K_8$ = Oxygen utilization efficiency (98 percent of $O_2$ is combusted)
$K_9$ = 2.54 pounds $O_2$ (which is required to burn one pound of coke, which contains 7 weight percent hydrogen, to $H_2O$ and a ratio of $CO_2/CO$ of 1.5/1)
$C_5$ = Weight fraction oxygen in air stream 7. The method according to claim 4 wherein said material balance calculation is computed according to the equation:

$$C = \frac{F_1 + F_2 - F_3}{F_1 + F_2}$$

wherein:

$C$ = Weight fraction of hydrocarbon feed material converted
$F_1$ = Virgin gas oil feed, pounds per hour
$F_2$ = Topped crude feed, pounds per hour
$F_3$ = Heavy cycle oil yield, pounds per hour 8. The method according to claim 4 wherein said predictive coke laydown calculation is computed according to the equation:

$$CLR = F_1(K_1 + K_2 C) + F_2(K_3 + K_4 C) + F_4(K_5 + K_6 C) + (F_1 + F_2 + F_4)K_7$$

wherein:

$CLR$ = A predictive coke laydown rate
$F_1$ = Virgin gas oil feed, pounds per hour
$K_1$ = Weight percent carbon residue in virgin gas oil
$K_2$ = Weight percent coke per percent converted for virgin gas oil
$C$ = Weight fraction of charge oils converted
$F_2$ = Topped crude feed, pounds per hour
$K_3$ = Weight percent carbon residue in topped crude oil
$K_4$ = Weight percent coke per percent converted for topped crude oil
$F_4$ = Recycle non-converted oil, pounds per hour
$K_5$ = Weight percent carbon residue in recycle oil
$K_6$ = Weight percent coke per percent converted for recycle oil
$K_7$ = Pounds coke per pound feed due to catalyst condition 9. A method for automatically controlling and optimizing the fluidized catalytic cracking of petroleum oils responsive to control signals calculated by a computer having a fixed program, comprising: measuring the temperature $T_5$, pressure $P_5$, composition $C_5$ and orifice differential pressure $\Delta T_5$ of air passed to a catalyst regenerator, measuring the rate of flow of the highest coke-forming hydrocarbon material to a fluidized catalyst reactor, measuring the rate of flow of a recycle stream from the bottom of a main fractionator to said reactor, measuring the rate of flow of a distillate hydrocarbon to said reactor, measuring the rates of flow of heavy cycle oil, light cycle oil, residue gases, $C_3$ and $C_4$ hydrocarbons, light gasoline, and full range gasoline product streams withdrawn from the fluidized catalytic cracking process; passing to said computer signals representative of said measurements; providing in the program of said computer a stoichiometric calculation, a material balance calculation, a predictive coke laydown calculation, and a profit signal responsive to a profit calculation, from which feedback and optimized automatic control is exercised; setting the air flow rate to the regenerator at its maximum value; computing the coke burning capacity of said regenerator corresponding to said maximum air flow rate, according to said stoichiometric calculation; transmitting the resulting first computed measurement signal to a coke laydown controller; computing the conversion of said hydrocarbon material feeds within said reactor according to said material balance calculation; computing therefrom predictively the rate of coke laydown in said reactor according to said coke laydown calculation; and transmitting the resulting second computed measurement signal to said coke laydown controller; comparing said first and second computed signals in said coke laydown controller and obtaining a first control signal whose magnitude is related to the difference between said first and second computed signals; transmitting the signal magnitude computed in the last-said computing step to a flow rate controller on the highest coke-forming charge oil feed line to said reactor; adjusting said charge oil feed rate until the coke laydown rate approximately equals the coke burning capacity; transmitting said profit signal to an optimized controller which adjusts the reactor temperature by means of varying the flow rate of regenerated catalyst from said regenerator and also adjusts the reactor catalyst bed level by means of varying the flow rate of the spent catalyst from said reactor, until the resulting hydrocarbon conversion level and distribution and yield of products from said reactor represents the maximum profit of the petroleum oils cracking operation.

10. The method according to claim 9 wherein said high-coke-forming charge oil feed is a topped crude.

11. The method according to claim 9 wherein said stoichiometric calculation is computed according to the equation:

$$CBC = \frac{C_{oA} K_8 C_5 \sqrt{\frac{\Delta P_5 P_5}{T_5}}}{K_9}$$

wherein:

$CBC$ = Coke burning capacity of said regenerator expressed in pounds per hour of coke $C_{oA}$ = Air venturi (orifice) coefficient
$\Delta P_5$ = Pressure drop in air feed line
$P_5$ = Flowing pressure of air feed
$T_5$ = Temperature of air feed
$K_8$ = Oxygen utilization efficiency (98 percent of $O_2$ combusted)
$K_9$ = 2.54 pounds $O_2$ (which is required to burn one pound of coke, which contains 7 weight percent hydrogen, to $H_2O$ and a ratio of $CO_2/CO$ of 1.5/1.)
$C_5$ = Weight fraction oxygen in air stream 12. The method according to claim 9 wherein said material balance calculation is computed according to the equation:

$$C = \frac{F_1 + F_2 - F_3}{F_1 + F_2}$$

wherein:

$C$ = Weight fraction of hydrocarbon feed material converted
$F_1$ = Virgin gas oil feed, pounds per hour
$F_2$ = Topped crude feed, pounds per hour
$F_3$ = Heavy cycle oil yield, pounds per hour 13. The method according to claim 9 wherein said predictive coke laydown calculation is computed according to the equation:

$$CLR = F_1(K_1 + K_2 C) + F_2(K_3 + K_4 C) + F_4(K_5 + K_6 C) + (F_1 + F_2 + F_4) K_7$$

wherein:

$CLR$ = A predictive coke laydown rate
$F_1$ = Virgin gas oil feed, pounds per hour
$K_1$ = Weight percent carbon residue in virgin gas oil
$K_2$ = Weight percent coke per percent converted for virgin gas oil
$C$ = Weight fraction of charge oils converted
$F_2$ = Topped crude feed, pounds per hour
$K_3$ = Weight percent carbon residue in topped crude oil
$K_4$ = Weight percent coke per percent converted for topped crude oil
$F_4$ = Recycle non-converted oil, pounds per hour
$K_5$ = Weight percent carbon residue in recycle oil
$K_6$ = Weight percent coke per percent converted for recycle oil
$K_7$ = Pounds coke per pound feed due to catalyst condition

References Cited by the Examiner

UNITED STATES PATENTS

| | | | |
|---|---|---|---|
| 2,421,616 | 6/47 | Hemminger et al. | 208—113 |
| 2,903,417 | 9/59 | Beaugh et al. | 196—132 |
| 2,963,422 | 12/60 | Hann | 208—164 |
| 3,000,812 | 9/61 | Boyd | 196—132 |

OTHER REFERENCES

"Consider Uses for Analog Computers," March 1959, Petroleum Refiner, pp. 215 to 220.

"Automatic Control of Chemical and Petroleum Processes," by Williams et al., Gulf Publishing Co., Houston Tex., 1961, chapter 748, pages 207 to 270.

ALPHONSO D. SULLIVAN, *Primary Examiner.*